Jan. 10, 1961 W. D. WILBUR Re. 24,921

CONCRETE SLAB KEY-JOINT FORMING MEMBER

Original Filed Jan. 11, 1957

INVENTOR
WARREN D. WILBUR

Gustave Miller
ATTORNEY

United States Patent Office

Re. 24,921
Reissued Jan. 10, 1961

24,921

CONCRETE SLAB KEY-JOINT FORMING MEMBER

Warren D. Wilbur, 13379 Pastel Lane, Mountain View, Calif., assignor of one-half to Richard N. Tone, Belmont, Calif.

Original No. 2,848,929, dated Aug. 26, 1958, Ser. No. 633,723, Jan. 11, 1957. Application for reissue Sept. 3, 1959, Ser. No. 838,011

7 Claims. (Cl. 94—17)

Matter enclosed in heavy brackets [ ] appears in the original patent but forms no part of this reissue specification; matter printed in italics indicates the additions made by reissue.

This invention relates to a concrete slab key joint forming member and has for an object to provide an approved key-joint forming member for use in concrete slab construction such as roadway paving, air field runways, building floors, and elsewhere wherever large slabs of concrete may be poured to form a uniform road, runway or floor surface.

A further object of this invention is to provide an approved concrete slab key-joint forming member which can be fabricated at a minimum expense which may be made of any suitable material, including sheet metal or extruded metal or plastic, wherein the metal may be sheet iron or sheet aluminum or may be extruded aluminum, or any other suitable metal or material.

A further object of this invention is to provide a key-joint forming member for use between adjacent slabs of poured concrete so that the concrete will automatically form a key-joint with the adjacent slab, and wherein a small wire or a large rod dowel may be placed in position through the member of this invention so as to provide a suitable expansion joint between adjacent slabs of concrete.

Still a further object of this invention is to provide a key-joint forming member or concrete slab construction which greatly reduces the cost of concrete slabs, which enables slabs of concrete to be poured simultaneously on both sides of the key-joint forming member of this invention, and at the same time provides a clean permanent cold or contraction straight line joint between adjacent slabs of concrete, thus preventing random cracking in the slab.

Still a further object of this invention is to provide a key-joint forming member which may be placed in operative position very inexpensively by merely hanging it over appropriate positioned stakes whereupon the concrete slab may be poured first on the side of the member which is away from its supporting stake, and may immediately and continuously be poured on the other side of the forming member without waiting for the first slab to harden.

Still a further object of this invention is to provide a key-joint forming member for concrete slabs wherein the forming member has an inverted U or inverted J hook at its upper end *defining a downwardly opening socket* which will hang over appropriately positioned stakes driven into the ground and thus be automatically positioned in the proper location ready for the concrete slab to be poured thereagainst and thereaftaer be poured on the other side thereof leaving the form permanently in position and providing a sharp and definite dividing edge between adjacent slabs.

Still a further object of this invention is to provide an approved key-joint forming member for concrete slabs which if desired may be used in cooperation with wood forms for temporary use and then be stripped away thereafter, but which preferably will be used with metal supporting stakes appropriately located whereupon the forming member of this invention may be quickly and readily positioned thereon at a substantial labor cost over the use of wooden forms, forming a permanent boundary for the slab construction at a substantially lower cost than is provided by old time methods of providing temporary wooden forms or wood supported forms.

Still a further object of this invention is to provide a key-joint forming member for concrete slabs which will form a V-notch extending into the side between the upper and lower surfaces of a concrete slab into which V notch the poured concrete of the next adjacent slab will enter and which may be poured without waiting for the first slab to harden.

Formerly large concrete slabs were poured in a checker board formation, making up each individual square of approximately 25 feet with wooden forms, then first pouring the concrete in alternate squares of the checker board which are non-contacting and waiting for such squares to harden, then stripping away the form and then pouring intermediate squares between the previously formed squares. With this invention, it is not necessary to provide the wooden forms at such great expense, instead, as when pouring a 5 in. slab, steel stakes about ⅛ in. thick by 1 in. wide are placed along the boundaries of the proposed squares by being driven into the ground until they extend at the proper height, just 5 inches above the properly prepared ground level. Then, the key-joint forming member of this invention is placed in position by merely suspending the inverted U or J hook integrally formed along its upper edge over the metal stakes, the overall height of a key-joint forming member for a five inch slab being 4½ inches so that the bottom edge is supported ½ inch above the ground level. Wire dowels or splice wires are inserted through appropriately spaced openings through the joint forming member so as to extend over the wire reinforcing grid normally placed in the concrete slab within the square before the concrete is poured. These wire dowels thus serve to substantially tie the wire reinforcing grids of adjacent squares together. If instead an expansion joint is to be formed as in road paving, then larger sized dowels made possibly of iron rods may be inserted through appropriately positioned apertures in the forming member, with one end of the rod greased so that the concrete at that end will not adhere thereto thus permitting expansion and contraction between adjacent squares of the slab, yet maintaining them on the same level.

With the foregoing and other objects in view, as will hereinafter become apparent, this invention comprises the construction, combination and arrangment of parts hereinafter set forth, disclosed, claimed and shown in the accompanying drawings wherein:

Figure 1:
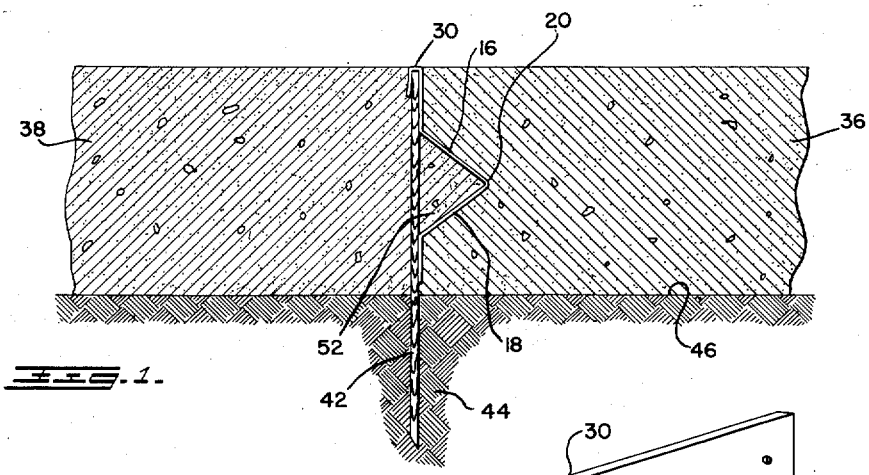
Fig. 1 is a section view through adjoining edges of a pair of concrete slab sections with the key-joint forming member of this invention in place therebetween.
Figure 2:
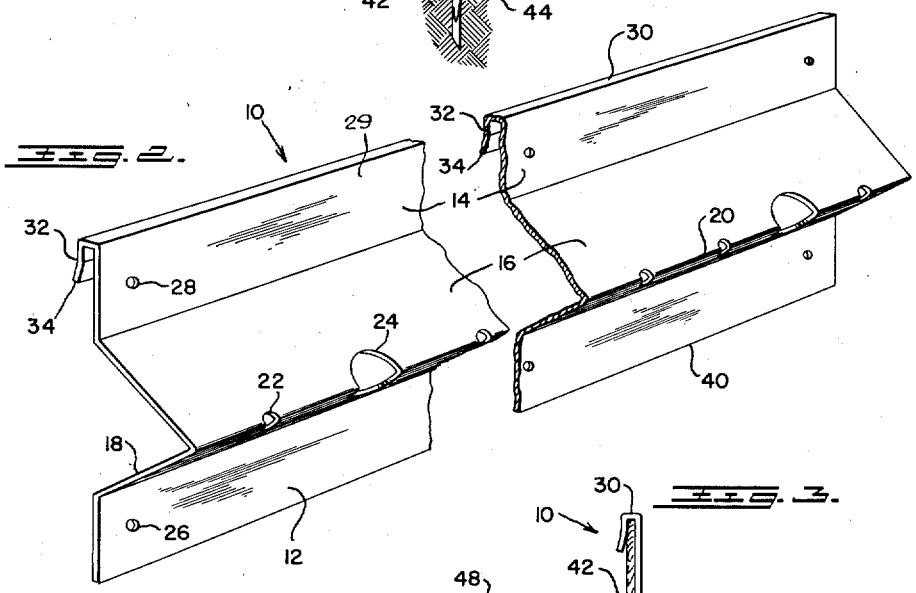
Fig. 2 is a perspective view of the key-joint forming member of this invention.

There is shown at 10 the concrete slab key-joint forming member of this invention. As shown in Fig. 2, this key-joint forming member may be made of any suitable material, such as sheet metal or sheet material, the sheet material being any suitable material such as plastic or other suitable material having sufficient strength. It may be fabricated by making appropriate folds from a strip of sheet metal or sheet material, or it may be fabricated by extruding it in the finished shape if desired. The member 10 as fabricated comprises a lower plane portion 12 and an upper plane portion 14 integrally secured together by the two angular intermediate portions 16 and 18 forming a V extending to one side of the plane of the portions 12 and 14. Inasmuch as these portions 12 and 14 will in operation be placed vertically, these portions will hereinafter be referred to as vertically extending plane portions, portion 12 being the lower vertical portion and portion 14 being the upper vertically extending portion. The angular intermediate portion 18 extends integrally up from the upper edge of the lower vertically extending portion 12, and similarly the upper angular intermediate portion 16 extends downwardly from the lower edge of the upper vertically extending plane portion 14, and meets the other angular portion 18 at a V apex 20, *thereby forming a longitudinally extending concavo-convex portion providing keyed interfitting tongue and groove portions in the parting faces of the adjacent slab sections.*

Either before or after forming the portions into their V apex, two series of suitably spaced apertures 22 and 24 may be formed therethrough. At the same time, a series of suitably spaced apertures 26 is provided in the lower vertically extending plane portion 12 and a similar series of apertures 28 is provided in the upper vertically extending portion 14. The purpose of these several series of apertures 22, 24, 26 and 28 will become apparent hereinafter.

The upper end of the upper vertically extending portion 29 is folded over at right angles as at 30 extending in a horizontal direction from the vertical portion opposite to the direction of the V apex 20 and forms a sharp right angle with the vertically extending portion 14. Then a portion 32 is folded downwardly from the portion 30, the portion 30 extending horizontally in relation to the vertically extending portion 14, and the downwardly extending portion 32 extends at a sharp right angle to the horizontally extending portion 30, so that the downwardly extending portion 32 is parallel with the vertically extending portion 14. Then the extreme end portion 34 of the downwardly extending portion 32 is flared outwardly at a slight degree as shown whereby the portions 30, 32 and 34 form an inverted U or an inverted J hook relative to the plane of the vertically extending portions.

Obviously, the concrete slab key-joint forming member 10 of this invention will be made in as many suitable sizes as is necessary according to the thickness of the concrete slab with which it is to be used. The dimensions will naturally be proportional to the particular thickness of the slab, but it will now be described for use in connection with a concrete slab 36 and 38 which will be 5 inches in thickness. In such case, the overall height of the fabricated key-joint forming member 10 of this invention will be 4½ inches between the horizontal portion 30 and the lower edge 40 of the lower vertically extending portion 12. In utilizing this member, a series of preferably flattened stakes, of metal, such as iron, will be placed along a surveyed line defining the edge of the slab 36 to be poured, these stakes 42 being driven into the ground 44 to a suitable depth *with their upper ends set to grade* so that just 5 inches of the stake 42 will extend above the level 46 of the supporting ground 44. Then, the member 10 will be supported by merely placing its flared inverted U or J hook end over the upper end of the series of aligned stakes 42, whereupon the horizontal portion 30 will be supported at *grade elevation* the exact height corresponding to the thickness of the slab 36 to be poured.

Figure 3:
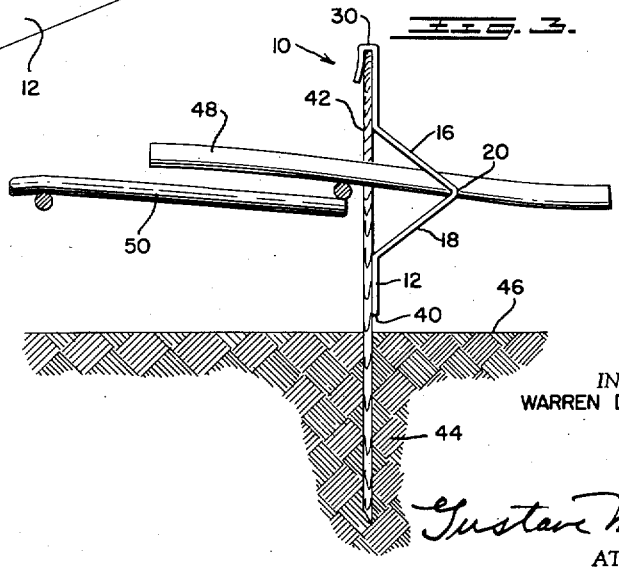
Fig. 3 is an end view of the key-joint forming member of this invention in operative position, ready for the concrete slab to be poured on opposite sides thereof.

Next, if [a key-joint] *reinforcement* is to be provided between adjacent slabs 36 and 38 to be poured, a series of wire dowels or splice wires 43, approximately 12 inches in length will be inserted through the spaced apart small apertures 22 in the V apex 20. As seen in Fig. 3, these dowels 48 will extend over the adjacent wire grid portions 50. In the particular size of slab above discussed, these wire grids 50 are made usually of No. 10 guage wire grids and in such case, the wire dowels or splice wires 48 are of No. 9 guage. The wire grids 50 are supported in the customary manner before the concrete is poured thereover. Inasmuch as the key-joint forming member 10 of this invention is supported on a series of stakes 42 merely by its own weight, without the necessity of tying or fastening the member thereto, the concrete slab 36 on the [male or tongue] *female or groove* side of the V apex 42 will first be poured thereby of course pressing the member 10 against its supporting stakes 42. As soon as the slab 36 has been poured, the slab 38 may be poured immediately without waiting for the slab 36 to harden, thereby, of course, enabling a continuous process of pouring concrete to take place. As the concrete slab 38 is poured, it will, of course, flow into the [female] *male or tongue* side of the V apex 20 as at 52, and, of course, will flow up under the hollow provided by the inverted U or J hook at the upper end of the upper vertically extending portion 14. *The stakes extend across (span) the concave side of the member so that the concrete forming the tongue 52 of the key flows around and interlocks with the stakes. Ensuing curing and shrinking of the concrete slabs thus effects a controlled parting of the sections in a straight line crack at the convex side of the member.*

The wire dowel receiving and supporting apertures 22 are about ¼ of an inch spaced apart at 6 inch centers starting at 3 inches from each end of the member 10.

After the concrete is poured, it may be smoothed or leveled immediately, the levelling rod being moved back and forth over the horizontal surface 30 which in pouring may be temporarily covered with concrete. The rods as conventional will be long enough to extend over the horizontal surfaces 30 at both ends of the slab thereby levelling the slab even with the surface of the horizontal portion 30 and thus providing a clean edge to the concrete when it contracts away therefrom after it has solidified.

If an expansion joint is to be provided, the series of large holes 24 at the V apex 20 is utilized by placing rod dowels therethrough approximately ½ inch or so in diameter, the apertures 24 being approximately ¾ of an inch in diameter so that the rod dowels may extend easily therethrough. As customary, these dowels may be 24 inches in length, one-half thereof being covered with a coating of grease before the concrete is poured thereover. In this manner, the rod dowel is securely fastened in one slab and slidably received in the other slab thereby providing an expansion joint yet maintaining both slabs at the same level in the customary manner.

The apertures 26 and 28 have been provided for use as nail holes, such apertures being ⅛ inch in diameter on a 24 inch center starting from each end of the member 10. These nail holes are provided for use in the case where the contractor may desire to utilize wooden stakes or wood forms for any reason, in which case the nail holes are already there for nailing the member 10 to the wooden forms for either temporary or permanent use as may be desired.

However, when the member 10 is merely to be used as a form between adjacent slabs, the wire dowels 48 may be used to splice the customary wire grids or mesh together in adjacent slabs 36 and 38.

[There has thus been provided by this invention a key-joint forming member for use in forming adjacent concrete slabs which may be poured successively without delay, without waiting for one slab to harden before the next slab is poured, which forms a key-joint between the slabs with a V apex extending from one slab 38 as at 52 into the adjacent slab 36. The cost of materials and of labor in utilizing this form as a key-joint forming member between adjacent slabs provides a substantial saving, as much as a labor saving of 90% over utilizing conventional method of wood forms. Although in some cases the form 10 may be stripped away, particularly where the adjacent slab is not poured until the previous slab has hardened, it probably will be less expensive to leave the form in position permanently and pour adjacent slabs continuously without taking time for the first poured slab to harden.] *There has thus been provided by this invention a combination and co-functioning of all of the following features:*

*(a) The provision of a low-cost expendable form for pouring adjacent sections of a concrete slab wherein the device functions as a form for supporting the concrete of both slabs, and the top of the device provides a straight line screed for finishing the top surfaces of the adjacent sections flush with the screeding edge and with each other, and*

*(b) The adjacent sections may be monolithically poured by pouring first the slab section at the side away from the stake and then immediately pouring the slab section at the other side in a continuous operation, and*

*(c) The joint is keyed with interfitting tongue and groove portion in the parting faces of the adjacent slab sections thereby permitting relative expansion and contraction of the sections while being maintained in a vertically interlocked condition, and*

*(d) The form is readily positioned with substantial savings in labor by first driving a plurality of stakes at spaced-apart intervals along the length of the joint with their upper ends set to grade, and then merely mounting the downwardly opening socket of the form member in supported position on the upper ends of the stakes so that the upper edge of the form member will be automatically supported at grade elevation, and*

*(e) The stakes are embedded in the tongue portion of the keyed joint so as to effect a straight line controlled parting of the adjacent sections at the convex side of the member.*

Although this invention has been described in considerably detail, such description is intended as being illustrative rather than limiting, since the invention may be variously embodied, and the scope of the invention is to be determined as claimed.

Having thus set forth and disclosed the nature of this invention, what is claimed is:

1. A combination form and contraction joint for adjacent slab sections of a monolithically poured concrete slab comprising a plurality of expendable flattened stakes set to grade at spaced apart aligned intervals, in combination with an expendable relatively rigid sheet material member comprising a vertically extending plane portion having an inverted J-hook at the top edge thereof, said inverted J-hook consisting of a horizontal portion extending at a right angle from the top edge of said vertical plane portion and terminating in a downwardly extending vertical portion of considerably less height than that of said vertical plane portion, said inverted J-hook snugly embracing and being [solely] supported at grade level on the upper ends of said flattened stakes with the vertically extending plane portions of said sheet member held in contact with the adjacent vertical portions of said stakes, whereby, when concrete is poured against said sheet material on the side away from said stakes, it will press said sheet material member against said supporting stakes, and concrete may then be poured immediately against the stake supporting side of said sheet material member.

2. The combination joint means of claim 1, at least the bottom portion of said downwardly extending portion of said inverted J-hook flaring outwardly away therefrom.

3. The combination joint means of claim 1, and a deflected key portion extending integrally from said vertically extending plane portion of said sheet material member in the opposite direction from said inverted J-hook.

4. The combination joint means of claim 3, said sheet material member having upper and lower plane portions in the same vertical plane, said deflected key portion extending longitudinally of said sheet material member intermediate said upper and lower plane portions.

5. The combination joint means of claim 4, said deflected key portion having side portions angularly offset from said vertical plane portions of said sheet material member.

6. The combination joint means of claim 5, said deflected key portion being V-shaped.

*7. A combination form and key contraction joint for adjacent slab sections of a monolithically poured concrete slab comprising, a plurality of expendable ground stakes having their upper ends set to grade at spaced-apart intervals along the length of the joint, and an elongated expendable relatively rigid sheet member providing the parting faces between said adjacent sections and being formed with a longitudinally extending concavo-convex portion providing keyed interfitting tongue and groove portions in said parting faces and being of inverted J-hook form providing a longitudinally extending inverted U-shaped top portion defining a downwardly opening socket at the concave side of said member receiving and being supported upon and snugly embracing said upper ends of said stakes and being supported thereby in a straight line and with the upper surface of said top portion at grade elevation thereby functioning as a screed for finishing the top surfaces of said sections flush with said edge and with each other, a lower portion of said member connected to and depending from said concavo-convex portion and adapted to be laterally supported by said stake whereby when concrete is poured against said member on the convex side away from said stake it will press said member against said stake and concrete may then be poured immediately against the opposite concave side of said member, said stakes traversing said concave side of said member for embedding in said tongue portion to thereby secure the concrete to said concave side and effect controlled parting of said sections at said convex side of said member.*

References Cited in the file of this patent or the original patent

UNITED STATES PATENTS

| | | |
|---|---|---|
| 271,582 | McKnight | Jan. 30, 1883 |
| 1,591,509 | Brookman | July 6, 1926 |
| 1,607,690 | Rue | Nov. 23, 1926 |
| 1,741,585 | Robertson | Dec. 31, 1929 |
| 1,769,828 | Fischer | July 1, 1930 |
| 1,770,359 | Fischer | July 8, 1930 |
| 1,804,215 | Fischer | May 5, 1931 |
| 1,939,007 | Heltzel | Dec. 12, 1933 |
| 1,963,088 | Heltzel | June 19, 1934 |
| 2,023,472 | Heltzel | Dec. 10, 1935 |
| 2,027,516 | Burrell | Jan. 14, 1936 |
| 2,374,623 | Sale | Apr. 24, 1945 |
| 2,630,892 | Hammitt et al. | Mar. 10, 1953 |
| 2,779,280 | Strange | Jan. 29, 1957 |